F. P. CHERMAK.
VEGETABLE TOPPING MACHINE.
APPLICATION FILED APR. 19, 1920.

1,364,713.

Patented Jan. 4, 1921.
3 SHEETS—SHEET 1.

INVENTOR.
FRANK P. CHERMAK

BY A. E. Carlser
ATTORNEYS.

F. P. CHERMAK.
VEGETABLE TOPPING MACHINE.
APPLICATION FILED APR. 19, 1920.

1,364,713.

Patented Jan. 4, 1921.
3 SHEETS—SHEET 3.

INVENTOR.
FRANK P. CHERMAK
BY A. E. Carlsen
ATTORNEY

UNITED STATES PATENT OFFICE.

FRANK P. CHERMAK, OF MINNEAPOLIS, MINNESOTA.

VEGETABLE-TOPPING MACHINE.

1,364,713. Specification of Letters Patent. Patented Jan. 4, 1921.

Application filed April 19, 1920. Serial No. 374,830.

*To all whom it may concern:*

Be it known that I, FRANK P. CHERMAK, a citizen of the United States, residing at Minneapolis, in the county of Hennepin and State of Minnesota, have invented certain new and useful Improvements in Vegetable-Topping Machines, of which the following is a specification.

My invention relates to vegetable topping machines and the object is to provide an improved construction of topping and grading machines especially adaptable for topping and grading beets. The invention is fully disclosed in the accompanying drawings, in which.

Figure 1:
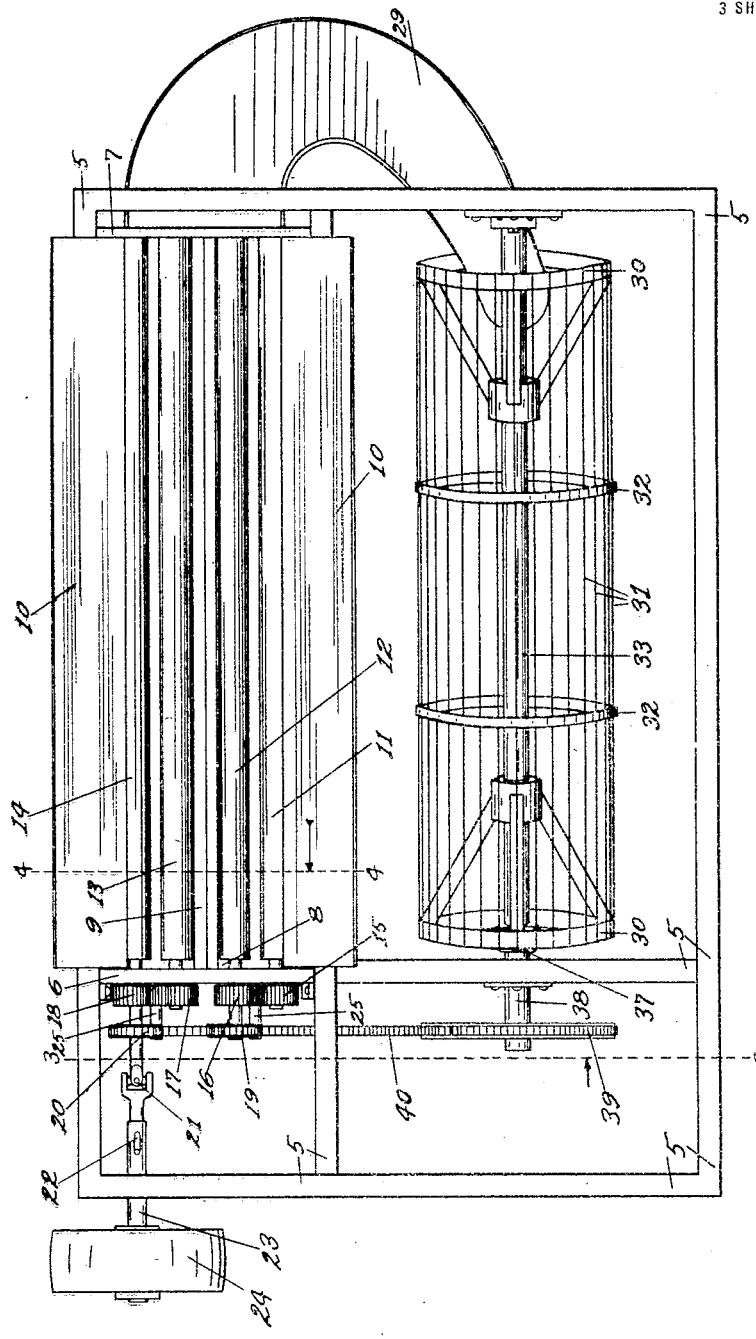
Figure 1 is a top view of the machine.

Referring to the drawings by reference numerals, 5 designates a suitable frame in which is supported an inclined topping frame consisting of end plates 6 and 7, a longitudinal two edged cutting bar 8, on which is secured a parting strip 9, and two angular side members 10. Four rollers 11, 12, 13 and 14 have their bearings in the plates 6 and 7, extending through the former at their upper ends, such ends being provided with pinions 15, 16, 17 and 18 the first and last pair intermeshing. The ends of the rollers 12 and 14 are further projected and provided with sprocket gears 19 and 20 respectively. The projecting end of the roller 14 is connected by a universal joint 21 and a sliding connection 22 to the shaft 23 (journaled in the frame) of a flywheel 24. Directly under each pair of rollers 11, 12 and 13, 14 is journaled a shaft 25 having a number of brackets 26 adapted to hold longitudinal cutting blades 27 in co-acting position against the edges of the cutting bar 8. Each of said shafts 25 is journaled at one end and extends through the plate 6, such ends being provided with sprocket gears 28.

The lower end of the topping frame is provided with a curved chute 29 adapted to guide topped beets or other similar vegetables into the grading device. The mechanism for thus grading the beets consists of two end hoops 30 between which are stretched a number of parallel longitudinal wires 31 so spaced as to allow the small beets and other foreign matter to fall through, the large and desired size of beets working down until deposited at the lower end of the grader.

Figure 2:
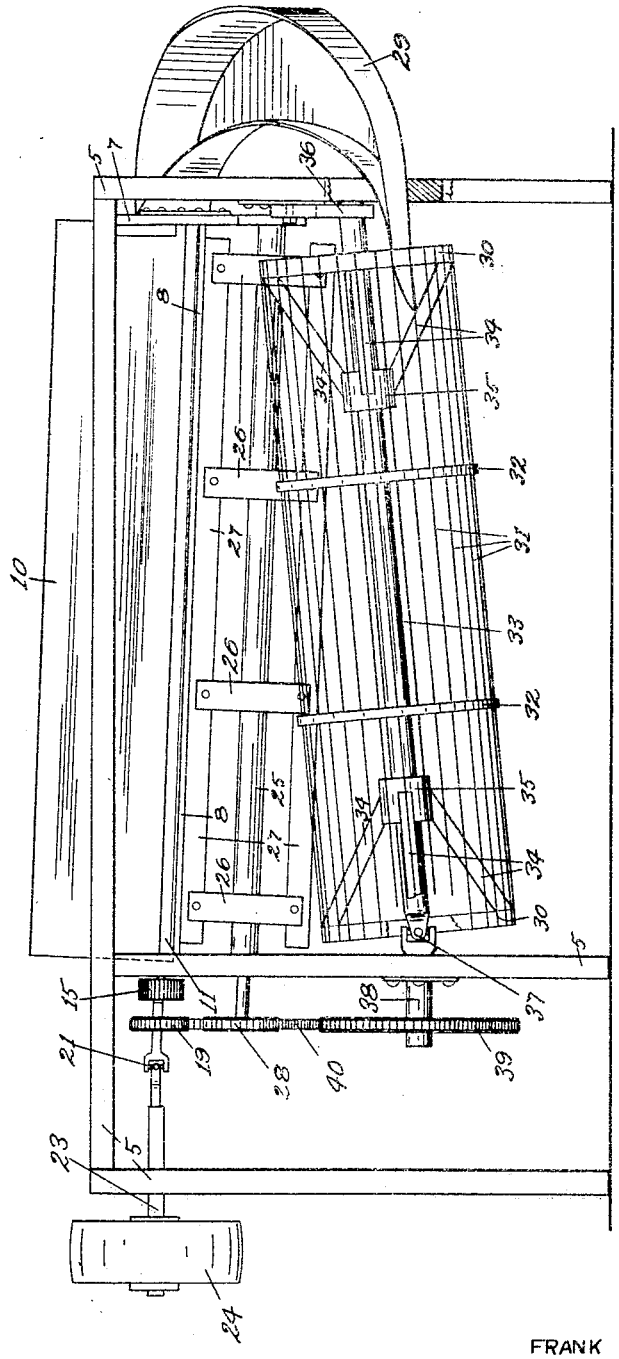
Fig. 2 is a side view of the machine, with portions broken away.

Auxiliary rings 32 are secured to and spaced at intervals about the wires thus preventing them from spreading apart and retaining the cylinder thus formed in more rigid position. The hoops 30 are secured to a shaft 33 by means of angular braces 34 which are secured to collars 35 on the shaft. This construction will prevent the hoops 30 from allowing the wires 31 to sag and will also allow the chute 29 to lead directly into the cylinder (see Figs. 1 and 2).

Figure 3:
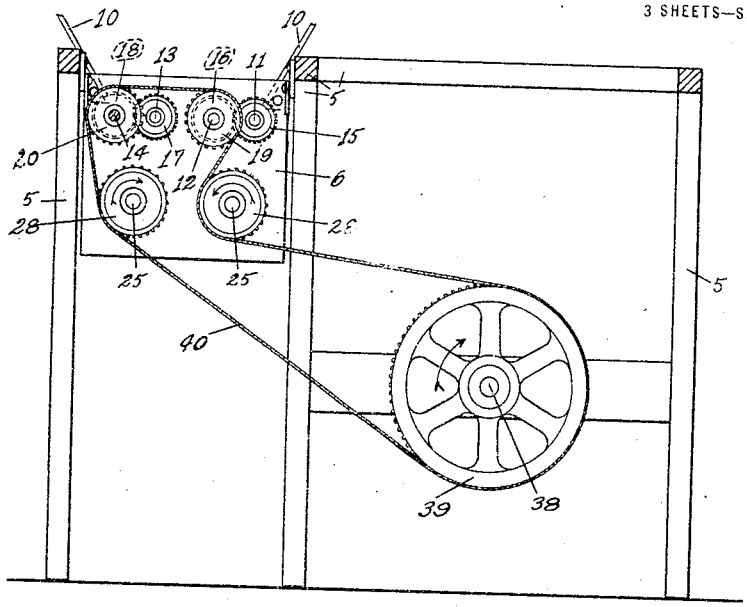
Fig. 3 is a sectional view as seen on the line 3—3 in Fig. 1, many elements being omitted.
Figure 4:
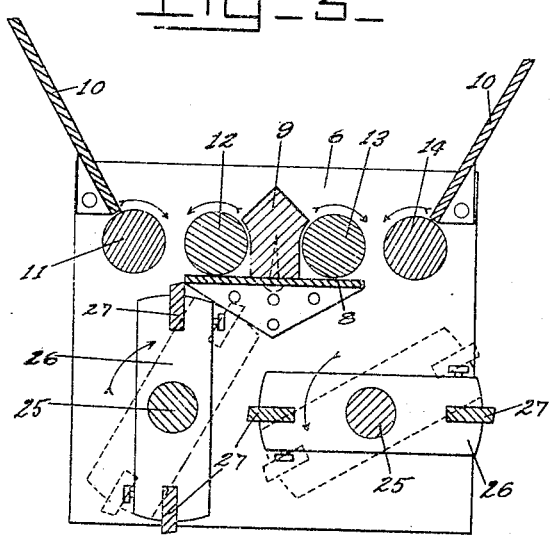
Fig. 4 is an enlarged detail sectional view as seen on the line 4—4 in Fig. 1.

The shaft 33 is journaled at one end in a bearing member 36 which is adjustable vertically on the frame and is provided at its other or lower end with a universal joint 37 which connects it with a short horizontal shaft 38 journaled in the frame. The shaft 38 is provided with a sprocket wheel 39. A sprocket chain 40 is stretched over the sprocket wheels and pinions 39, 28, 19 and 20. The object of passing the chain under the sprocket wheel 28 on the shaft 25 (see Fig. 3) is to cause the knives 27 and brackets 26 to revolve in opposite directions and thus better cut against the edges of the plate 8. This arrangement also allows the knives to pass each other without needing to position the shafts 25 too far apart (see Fig. 4). With this arrangement of gear pinions and sprockets it is also obvious that each set of rollers 11, 12 and 13, 14 will be caused to revolve toward each other.

Thus when a number of beets are placed on the topping frame and the machine is put in motion by a belt over the pulley or flywheel 24, it is clear that the tops will be pulled down by the actions of the rollers, and will be cut off against the plate 8 by the knives 27. The parting strip 9 and the position of the sides 10 will prevent the slipping of the beets to the wrong or up sides of the rollers. As the beets are topped they naturally roll down the frame until they reach the chute 29 which leads them directly into the grader, which by reason of its being revolved drops the small undesirable beets and foreign matter through the wires and delivers at the lower end of the grader nothing but the topped, clean and large beets.

It is understood that various modifications may be made in the design and construction of this machine if such modifications come within the scope of the appended claims.

Having now therefore fully shown and described my invention, what I claim to be new and desire to protect by Letters Patent is:

1. A vegetable topping machine consisting of a suitable frame, a number of spaced parallel rollers journaled in the frame, means for rotating said rollers toward each other in pairs, a cutting plate having cutting edges, fixed in said frame with said edges directly under respective pairs of rollers, rotatably mounted knives adapted to coact against said edges as said rollers are being rotated.

2. A vegetable topping machine consisting of a suitable frame, a number of spaced parallel rollers journaled in the frame, means for rotating said rollers toward each other in pairs, a cutting plate having cutting edges, fixed in said frame with said edges directly under respective pairs of rollers, rotatably mounted knives adapted to coact against said edges as said rollers are being rotated, said knives being adapted to rotate toward each other and to coact alternatively against said edges.

3. A vegetable topping machine consisting of a suitable frame, two pairs of spaced parallel rollers journaled in the frame, means for rotating the rollers of each pair toward each other simultaneously, a cutting plate fixed in said frame and having longitudinal cutting edges positioned substantially under the openings between the rollers of each pair, rotatably mounted knives adapted to coact against said edges as said rollers are being rotated.

In testimony whereof I affix my signature.

FRANK P. CHERMAK.